US010032305B2

(12) United States Patent
West

(10) Patent No.: US 10,032,305 B2
(45) Date of Patent: *Jul. 24, 2018

(54) METHOD AND SYSTEM FOR CREATING CHARACTER POSES IN A VIRTUAL REALITY ENVIRONMENT

(71) Applicant: Unity IPR ApS, Copenhagen K (DK)

(72) Inventor: Timoni West, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,325

(22) Filed: May 31, 2017

(65) Prior Publication Data

US 2017/0270703 A1 Sep. 21, 2017

Related U.S. Application Data

(63) Continuation of application No. 15/274,148, filed on Sep. 23, 2016, now Pat. No. 9,741,148.
(Continued)

(51) Int. Cl.
*G06T 13/40* (2011.01)
*G06T 19/00* (2011.01)
(Continued)

(52) U.S. Cl.
CPC .......... *G06T 13/40* (2013.01); *G02B 27/0172* (2013.01); *G06F 3/04883* (2013.01); *G06T 15/005* (2013.01); *G06T 19/006* (2013.01); *G02B 2027/014* (2013.01); *G02B 2027/0138* (2013.01)

(58) Field of Classification Search
None
See application file for complete search history.

(56) References Cited

U.S. PATENT DOCUMENTS 8,928,672 B2   1/2015  Corazza et al.
8,941,666 B1   1/2015  Kovar
(Continued)

OTHER PUBLICATIONS

U.S. Appl. No. 15/274,148, Non Final Office Action dated Dec. 29, 2016, 21 pgs.
(Continued)

*Primary Examiner* — Michael J Cobb
(74) *Attorney, Agent, or Firm* — Schwegman Lundberg & Woessner, P.A.

(57) ABSTRACT

A system includes hardware processor(s), an HMD, an input device, and an onion skin animation module. The animation modules is configured to receive a character rig of a 3D character, receive a first 3D animation of the 3D character, the first 3D animation defines a motion sequence of the 3D character based on the character rig, create a virtual time bar within the virtual environment, the virtual time bar displaying a timeline associated with the first 3D animation, identify a first animation time within the first 3D animation, the first animation time is a point in time during the motion sequence, create a first pose object of the 3D character in the virtual environment, pose the first pose object based on the first 3D animation at the animation time, and positioning the first pose object within the virtual environment proximate the first animation time on the virtual time bar.

17 Claims, 15 Drawing Sheets

Related U.S. Application Data

(60) Provisional application No. 62/232,309, filed on Sep. 24, 2015.

(51) Int. Cl.
*G06F 3/0488* (2013.01)
*G06T 15/00* (2011.01)
*G02B 27/01* (2006.01)

(56) References Cited

U.S. PATENT DOCUMENTS

| | | | |
|---|---|---|---|
| 9,082,018 | B1 | 7/2015 | Laska et al. |
| 9,741,148 | B2 | 8/2017 | West |
| 2009/0091575 | A1* | 4/2009 | Borac .................... G06T 13/40 345/474 |
| 2009/0251462 | A1 | 10/2009 | Kaytis et al. |
| 2010/0174993 | A1 | 7/2010 | Pennington et al. |
| 2010/0190556 | A1 | 7/2010 | Chan |
| 2010/0214313 | A1 | 8/2010 | Herman et al. |
| 2011/0216074 | A1 | 9/2011 | Witkin et al. |
| 2013/0127873 | A1 | 5/2013 | Popovic et al. |
| 2013/0222433 | A1 | 8/2013 | Chapman et al. |
| 2014/0198106 | A1 | 7/2014 | Sumner et al. |
| 2014/0198107 | A1 | 7/2014 | Thomaszewski et al. |
| 2014/0333614 | A1* | 11/2014 | Black .................. G06F 17/5009 345/419 |
| 2014/0364967 | A1 | 12/2014 | Sullivan |
| 2015/0177961 | A1 | 6/2015 | Peythieux et al. |
| 2016/0239080 | A1 | 8/2016 | Marcolina et al. |
| 2017/0091977 | A1 | 3/2017 | West |
| 2017/0358118 | A1* | 12/2017 | Bard ........................ G06T 1/60 |

OTHER PUBLICATIONS

U.S. Appl. No. 15/274,148, Notice of Allowance dated Apr. 13, 2017, 9 pgs.

U.S. Appl. No. 15/274,148, Response filed Mar. 28, 2017 to Non Final Office Action dated Dec. 29, 2016, 13 pgs.

* cited by examiner

METHOD AND SYSTEM FOR CREATING CHARACTER POSES IN A VIRTUAL REALITY ENVIRONMENT

RELATED APPLICATIONS

This application claims the benefit of priority to U.S. Provisional Patent Application Ser. No. 62/232,309, filed Sep. 24, 2015, herein incorporated by reference in its entirety.

This application is a continuation of U.S. patent application Ser. No. 15/274,148, filed Sep. 23, 2016, herein incorporated by reference in its entirety.

TECHNICAL FIELD

The subject matter disclosed herein generally relates to the technical field of special-purpose machines that facilitate 3-dimensional (3D) animation, including software-configured computerized variants of such special-purpose machines and improvements to such variants, and to the technologies by which such special-purpose machines become improved compared to other special-purpose machines that facilitate 3D animation. Specifically, the present disclosure addresses systems and methods to facilitate software tools for use in developing 3D characters using a virtual reality (VR) onion animation tool.

BACKGROUND

Existing technology for creating 3D animation uses character rigs manipulated in list views by animators. These character rigs generally include a skeleton attached to a 3D mesh with the skeletons having joints that can be manipulated to create motion. The joints are typically displayed in a listview and can be manipulated either individually or in a group. One method used by animators to view the dynamic progression of an animation is to use ghosting techniques. In this technique an animation is displayed at various timeframes whereby only an outline of the animated body is shown for each timeslot. Displaying successive onion skins gives the impression of motion to the viewer. Working with onion skins can be difficult, and particularly when working in a two-dimensional (2D) interface, where 3 spatial dimensions and time are being compressed into a 2D space. Existing onion skin tools are often limited in what they can show since most of the animations are close to each other and become very crowded. This technical problem of how to render and present 3D objects that change in time to users on a 2D interface (e.g., a display screen) becomes more acute in VR environments where list views are even more problematic since text is more difficult to read and the condensed nature of list views makes them hard to interact with within a natural user interface (NUI).

BRIEF DESCRIPTION OF THE DRAWINGS

Various ones of the appended drawings merely illustrate example embodiments of the present disclosure and cannot be considered as limiting its scope, and in which.

It will be noted that throughout the appended drawings, like features are identified by like reference numerals.

Figure 1:
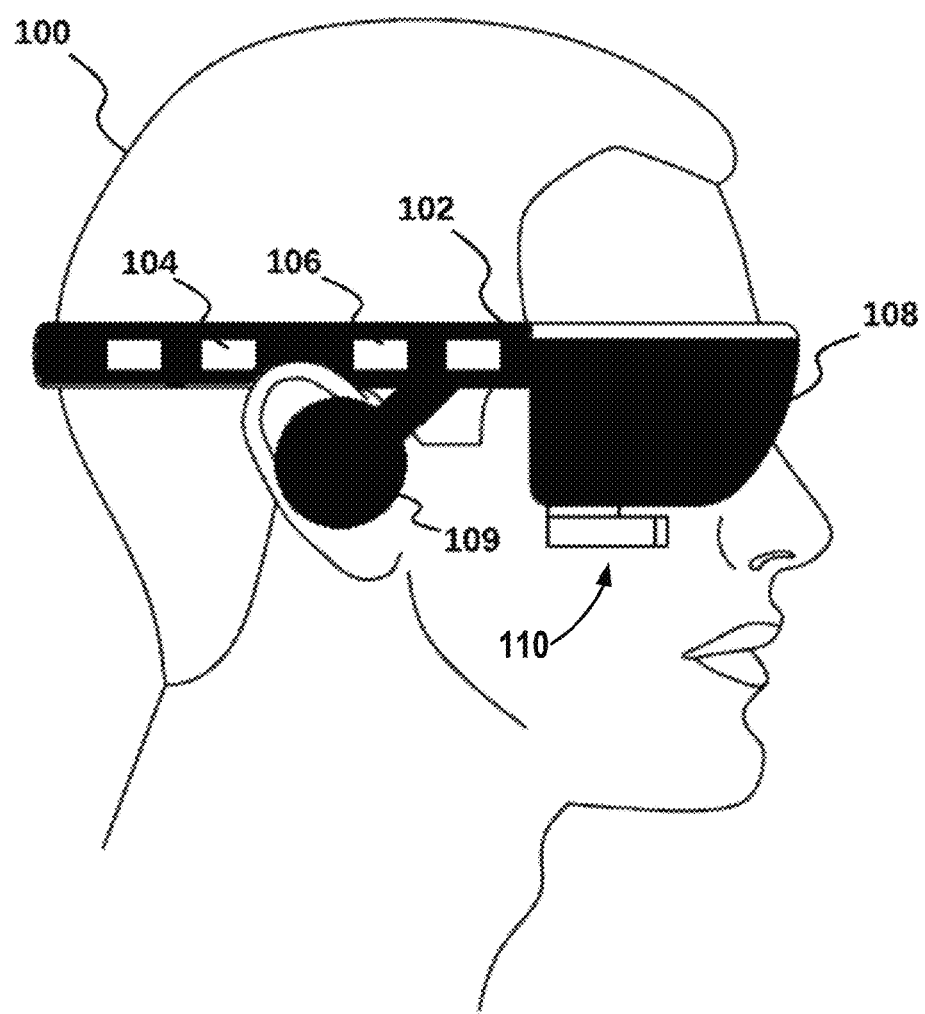
FIG. 1 is a diagram of an example HMD worn by a user.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The systems and methods described herein provide solutions to many of the challenges facing 3D animators ("users"). An onion skin animation system and methods are described herein. In many of the example embodiments described herein, the onion skin animation system leverages VR during animation creation and editing. For example, the user may wear a head mounted display (HMD) and may operate one or more hand-held tracking input devices to interact with the animation system, allowing the user to experience the animation system via VR. While the primary examples of the animation system are described within the context of a VR environment, the animation system may also be used in augmented reality (AR) environments. VR, AR, and to some extent the associated hardware devices, allow time, space, and animations to be viewed in new ways when compared to conventional display devices such as computer screens. In order to take advantage of this, the animation system presents an open and visual timeline-based view for creating and modifying 3D animations (e.g., for a particular object). This open timeline-based view utilizes the available viewing space within a VR environment to display multiple timeline views in an interactive, organized, and logical way, and allows the user to interact with these views within the VR environment.

The animation system also allows the user to work in an immersive environment where the 3D objects can be life-sized. The large relative size of objects allows the user to more easily interact with them within a more natural user interface (e.g., as compared to a conventional 2D display). The animation system may be used for 3D character design and animation. Many of the examples provided herein use humanoid characters as animation objects. However, it should be understood that the animation system is applicable to the animation of any 3D object (e.g., regardless of shape or skeletal composition). The animation system may accept as input animation files or animation rigs for 3D objects, with or without a mesh (e.g., skin).

FIG. 1 is a diagram of an example HMD 102 worn by a user 100. In the example embodiment, the user 100 (e.g., a game developer or game player) experiences a virtual environment (e.g., via VR) or augmented reality (AR) content while wearing the HMD 102. The HMD 102 includes a visor 108 having two display devices (e.g., one for each eye), a central processing unit (CPU) 104, a graphical processing unit (GPU) 106, and earphone speakers 109. The display device(s) may include one or more opaque display surfaces (e.g., providing VR content, or a complete visual experience for the user 100), or the display device(s) may include one or more semi-opaque or clear display surfaces (e.g., providing AR content to the user 100). In some embodiments, the visor 108 may include a single display device (e.g., split for both eyes). The HMD 102 also includes one or more camera devices 110 configured to capture real-world digital video around the user 100 (e.g., a field of view, a peripheral view, or a 360° view around the user 100). The camera devices 110 may be used to capture the real world environment around the user 100, thereby allowing the HMD 102 to provide that content as a part of a VR environment (e.g., a mixed AR/VR environment) displayed to the user 100. In some embodiments, the HMD 102 may be similar to virtual reality HMDs such as the Oculus Rift®, The HTC Vive®, The Playstation VR®, and the like.

In some embodiments, the user 100 also holds a pair of handheld tracking devices ("handhelds") (not shown), one in each hand. The handhelds provide information about the absolute or relative position and orientation of a user 100's hands and, as such, are capable of capturing hand gesture information. The handhelds may be configured to operate directly with the HMD 102 (e.g., via wired or wireless communication). In some embodiments, the handhelds may be Oculus Touch® hand controllers, HTC Vive® hand trackers, or Playstation VR® hand controllers. The handhelds may also include one or more buttons or joysticks built into the handheld.

In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user 100's hands) such as, for example, those made commercially available by Leap Motion, Inc. (a California corporation). Such hand tracking devices (e.g., handhelds) track the position of one or more of the hands of the user 100 during operation.

Figure 2:
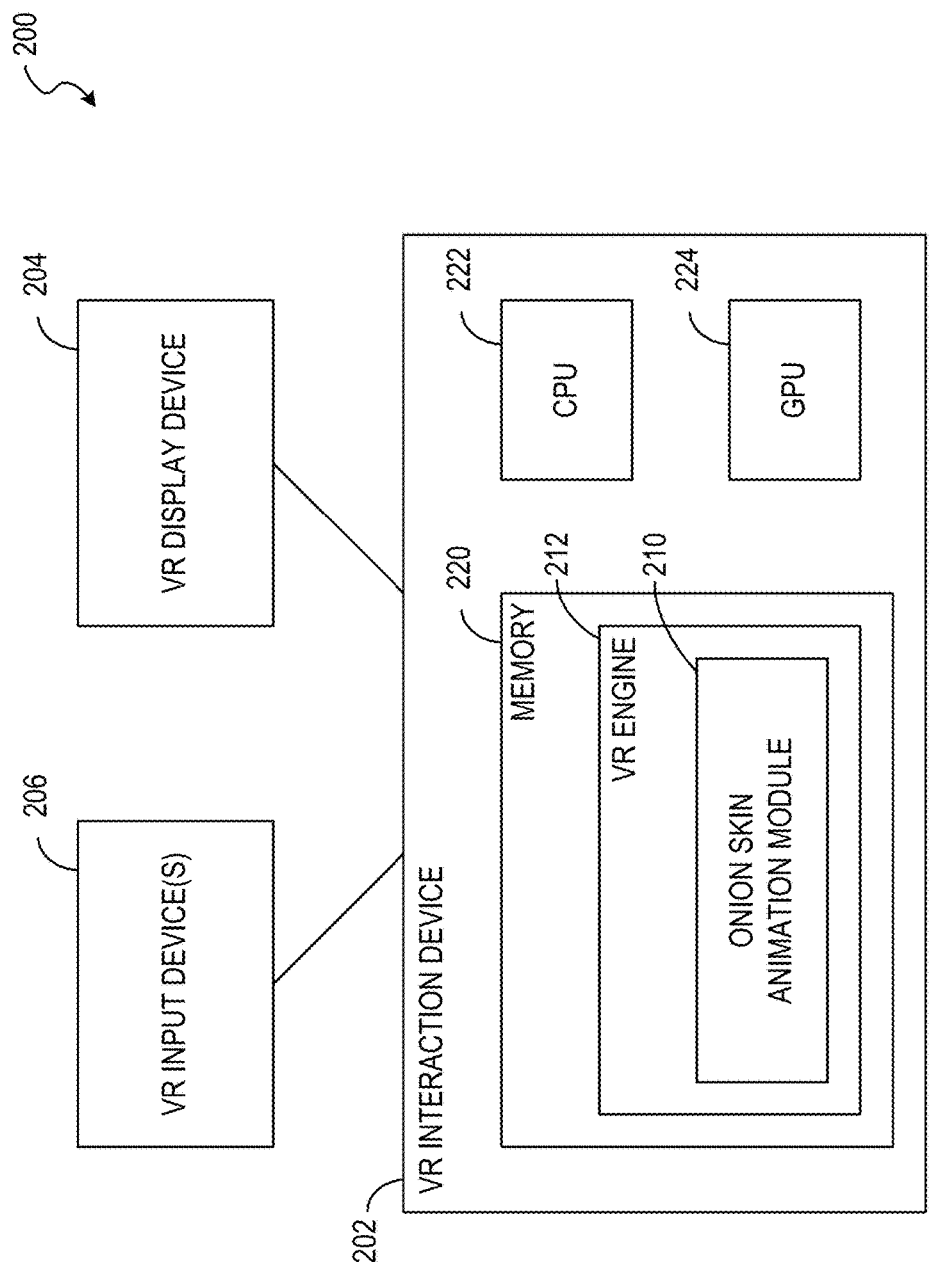
FIG. 2 is a component diagram of an example onion skin animation system (or just "animation system") that includes components similar to the HMD shown in FIG. 1.

FIG. 2 is a component diagram of an example onion skin animation system (or just "animation system") 200 that includes components similar to the HMD 102 shown in FIG. 1. The onion skin animation system 200 includes a VR interaction device 202, a VR display device 204, and one or more VR input devices 206. In some embodiments, the VR display device 204 may be similar to the visor 108, and the VR input device(s) 206 may be similar to the handhelds or other tracking devices described above in reference to FIG. 1. In the example embodiment, the VR interaction device 202 includes a memory 220, one or more CPUs 222, and one or more GPUs 224. In some embodiments, the CPU 222 may be similar to the CPU 104, the GPU 224 may be similar to the GPU 106, and the VR interaction device 202 may be a part of the HMD 102.

In the example embodiment, the VR interaction device 202 includes a VR engine 212 (e.g., a game engine), executed by the CPU 222 or GPU 224, that provides a virtual environment through the VR display device 204 (e.g., to the user 100). The VR engine 212 includes an onion skin animation module (or just "animation module") 210 implemented within, or otherwise in communication with, the VR engine 212. In some embodiments, the virtual environment provided by the VR engine 212 or the animation module 210 may be a virtual world associated with a computer game (e.g., a VR development environment for creating 3D objects used in the computer game). For example, a developer may utilize the virtual environment for creation and editing of 3D objects and their associated animations.

The animation module 210 and the VR engine 212 include computer-executable instructions residing in the memory 220 that are executed by the CPU 222 or the GPU 224 during operation. The VR engine 212 communicates with the VR display device 204 (e.g., the HMD 102) and also with other VR hardware such as the VR input device(s) 206 (e.g., motion capture devices such as the handhelds). The animation module 210 may be integrated directly within the VR engine 212, or may be implemented as an external piece of software (e.g., a plugin).

In some embodiments, the animation system 200 and the various associated hardware and software components described herein may provide AR content instead of, or in addition to, VR content. It should be understood that the systems and methods described herein may be performed with AR content and, as such, the scope of this disclosure covers both AR and VR applications. Further, while many of the examples provided herein describe the user 100 operating within a virtual environment as a developer (e.g., editing the virtual world for later presentation to a player via a gaming engine), it should be understood that the 3D objects and associated animations, so constructed, may later be presented to players via a conventional 2D or 3D display.

Figure 3:
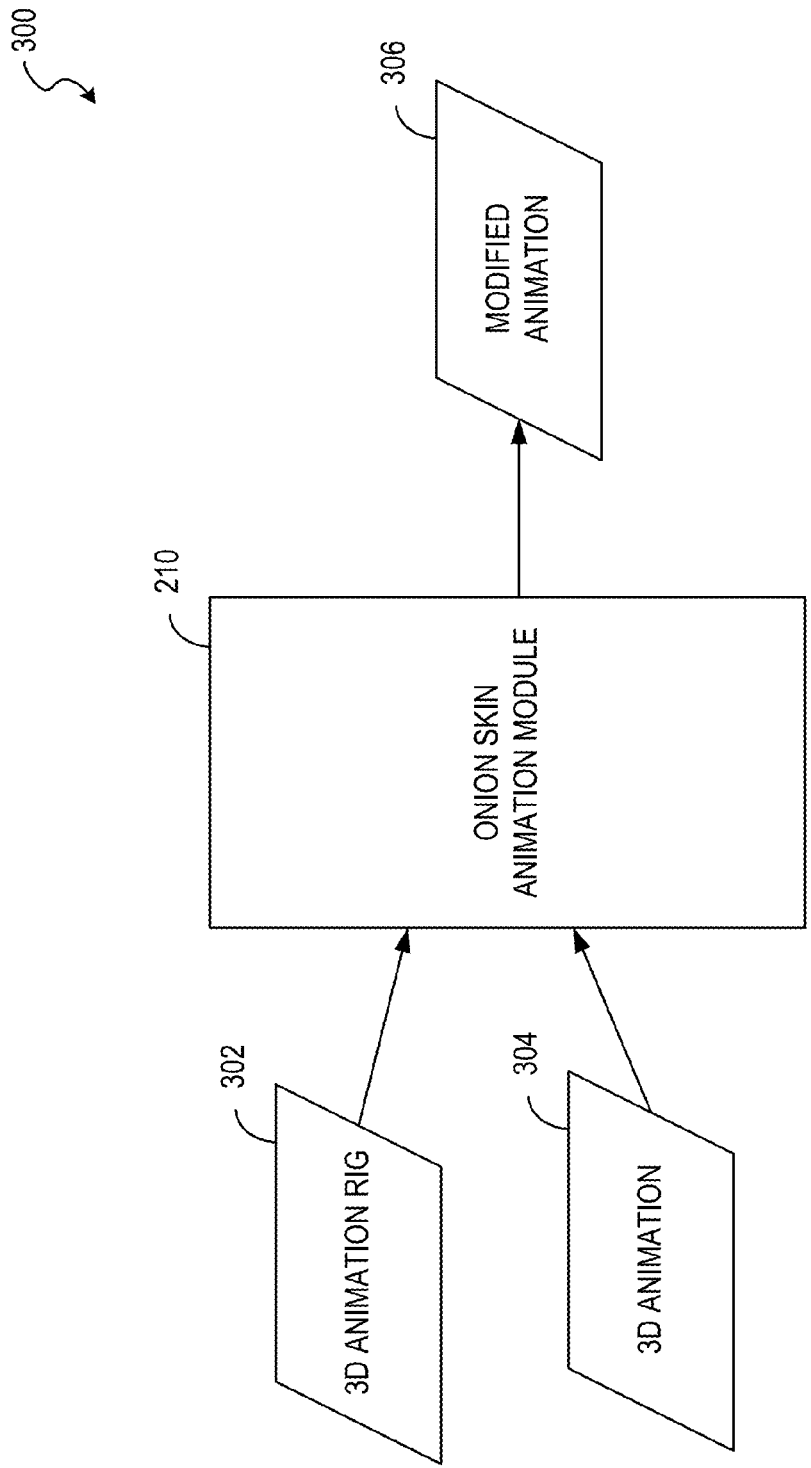
FIG. 3 illustrates example inputs and outputs of the onion skin animation module.

FIG. 3 illustrates example inputs and outputs of the onion skin animation module 210. In the example embodiment, the animation module 210 utilizes a 3D animation rig 302 (e.g., for a 3D character) and a 3D animation 304. The 3D animation rig 302 may be, for example, a simple skeleton without a mesh, or a full rig including skeleton and mesh. The 3D animation 304 may include model data, rigging data, and animation data (e.g., a character rig (or skeleton), animation data for the character rig, and a background). The animation data may be in any format known to those skilled in the art that enables the systems and methods described herein. Using the 3D animation rig 302 and the 3D animation 304, the animation module 210 generates a modified animation 306. The modified animation 306 may be an animation in any format known to those skilled in the art that enables the systems and methods described herein. In some embodiments, only the animation rig 302 is used by the animation module 210, and the user 100 generates a new animation as an output of the animation module 210.

In the example embodiment, the animation module 210 displays no background for the animation. In some embodiments, the animation module 210 may present a single, static background (e.g., to give context to a 3D object). In other embodiments, the animation module 210 may allow the user 100 to toggle a background on and off (e.g., giving context to the 3D object when desired by the user 100).

During operation, the user 100 may, for example, modify the 3D animation 304 by changing poses of the 3D object at points during the animation 304 (e.g., making changes in rig math associated with the animation 304). The animation module 210 provides a virtual environment and tools to facilitate various user-implemented changes, as well as automatic changes made by the animation module 210 based on those users-implemented changes. When the user 100 is finished making modifications, the animation module 210 may generate the modified animation 306 (e.g., saving the updated animation with updated rig math in an animation file format).

Figure 4:
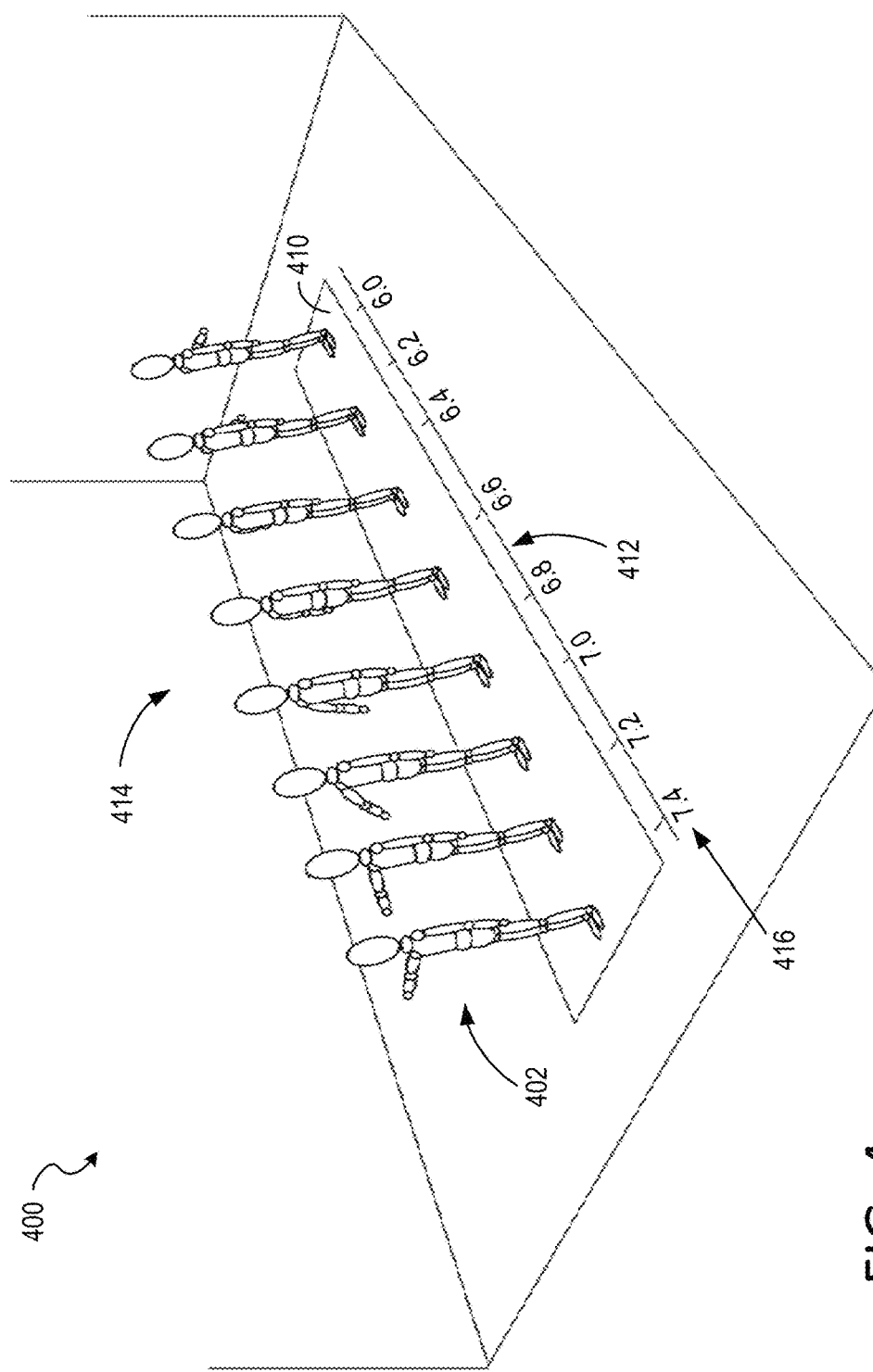
FIG. 4 is a diagram of an example virtual environment presented to the user by the animation module.

FIG. 4 is a diagram of an example virtual environment 400 presented to the user 100 by the animation module 210. In the example embodiment, the user 100 is editing the 3D animation 304 for a 3D object, a character 402. As shown in FIG. 4, the animation module 210 presents a user interface within the virtual environment 400 (e.g., a "development environment"). The virtual environment 400 includes an interactive timeline platform 410 of a section of animation for the character 402. The interactive timeline platform 410 includes a time bar 412 and multiple pose objects 414 of the character 402. Each pose object (or just "pose") 414 is a virtual object of the 3D character representing a pose of the character at particular time within the animation. In some embodiments, the time bar 412 displays time in standard units of time (e.g., hours, minutes, seconds, and so forth). In other embodiments, the time bar 412 may be displayed in units other than time, such as animation frame numbers or the like.

To create the pose objects 414, in the example embodiment, the animation module 210 reads an animation file (e.g., the 3D animation 304) and constructs a virtual object for the character 402 at various points in time (e.g., the pose objects 414). In other embodiments, the animation module 210 may read the animation file and display the poses 414 as different camera views of the character rendered at different times (e.g., placing mesh colliders at rig points in 3D space).

Each displayed pose 414 of the character 402 on the time bar 412 corresponds with a point in time (an "animation time") 416, or a frame number, with the adjacent poses 414 of the character 402 being either just forward in time or just backward in time. In the example shown in FIG. 4, the animation module 210 displays the character 402 at eight animation times 416, where each of the eight poses 414 corresponds to one of the animation times 416. More specifically, each animation time 416 is defined at an animation increment on the time bar 412 between 6.0 seconds (s) and 7.4 s of the animation, where the animation increment in this example is 0.2 s. In other embodiments, the animation increment may be non-linear, irregular, or pre-defined (e.g., by the user 100, or by the 3D object asset). This view of the animation allows the user 100 to simultaneously see displays of the character 402 at various times within the animation. In some embodiments, each displayed object (e.g., at each of the animation times 416) corresponds with a keyframe for the displayed animation.

In the example embodiment, the interactive timeline platform 410 includes a group of objects within the virtual environment 400. In some embodiments, the interactive timeline platform 410 may be scaled in size (e.g., relative to the user 100), (e.g., life-size, for animation of human-like objects). The user 100 may walk around the platform 410 within the virtual environment 400 to see it from different perspectives and can walk up to the display and interact with any object within it. The user 100 may interact with objects within the interactive timeline platform 410, such as the time bar 412, or any of the individual poses 414 of the character 402 shown at each particular animation time 416. Interacting with any one of the pose objects 414 may cause modifications to the adjacent poses 414. The animation module 210 detects various interactions with a pose object 414 and calculates alterations to the adjacent poses 414. The animation module 210 then updates the adjacent poses 414 accordingly.

Figure 5:
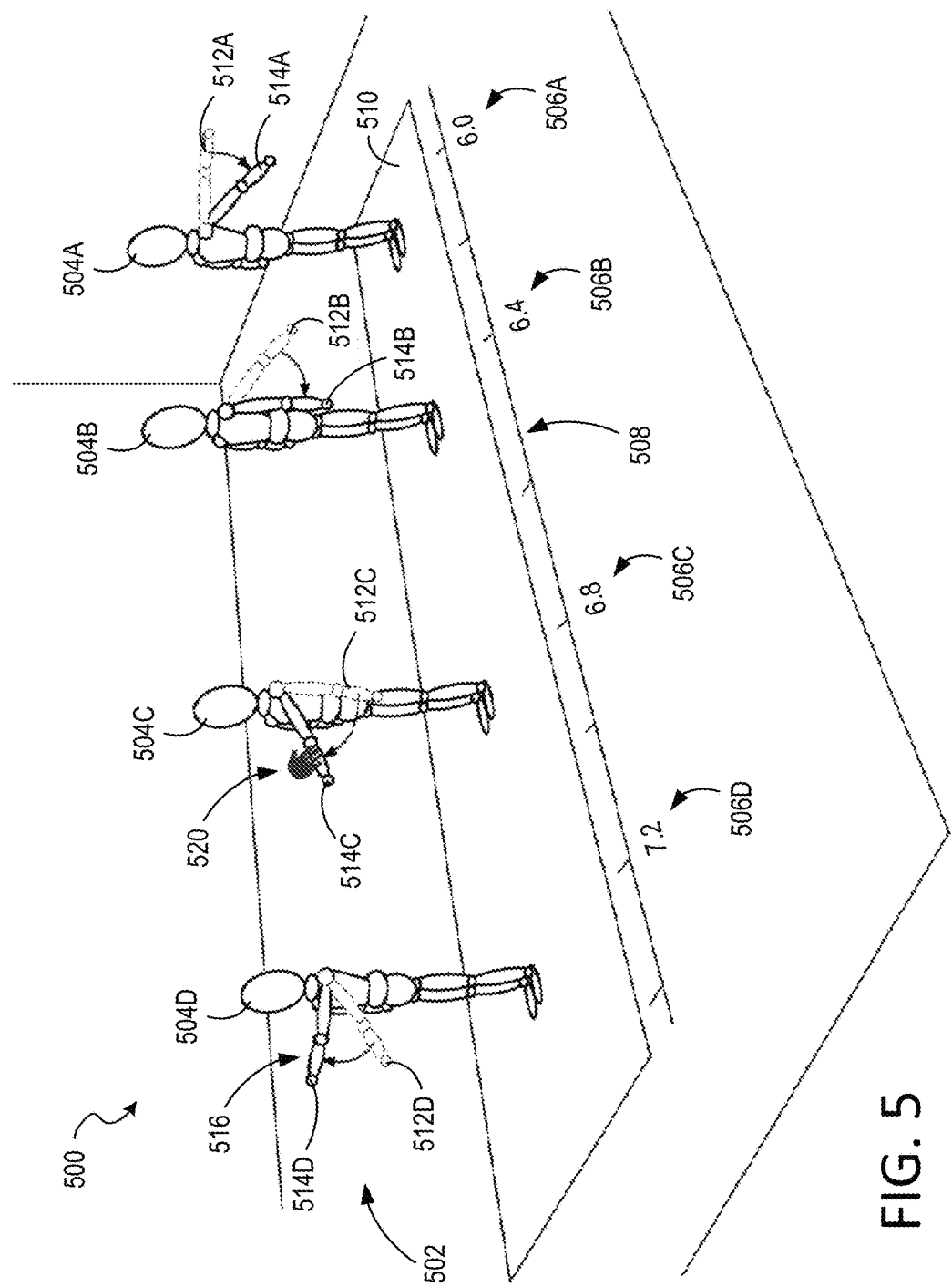
FIG. 5 illustrates various example object manipulations being performed by the user on the pose objects of an animation for a character (e.g., a humanoid character) using an animation timeline view provided by the animation module.

FIG. 5 illustrates various example object manipulations being performed by the user 100 on pose objects 504A-D (collectively, pose objects 504) of an animation for a character 502 (e.g., a humanoid character) using an interactive timeline platform 510 provided by the animation module 210. In the example embodiment, the animation module 210 has created the four pose objects 504A-D in a virtual environment 500 at animation times 506A-D (collectively, animation times 506, e.g., at times t=6.0 s, 6.4 s, 6.8 s, and 7.2 s), respectively, on a time bar 508. In some embodiments, the virtual environment 500 may be similar to the virtual environment 400, the character 502 may be similar to the character 402, the pose objects 504 may be similar to the poses 414, the animation times 506 may be similar to the animation times 416, the time bar 508 may be similar to the time bar 412, and the platform 510 may be similar to the interactive timeline platform 410.

In the example embodiment, the illustrated animation is being created or edited by the user 100 to form a forward movement animation (e.g., the modified animation 306) for the character 502. In this example, the pose objects 504C is manipulated by the user 100 within the virtual environment 500 (e.g., using the VR input device(s) 206, as illustrated by a virtual hand 520). More specifically, the user 100 manipulates the swinging of an arm 516 (e.g., the left arm) of the character 502 at the animation time 506C, t=6.8 s. In each pose 504, the character 502 initially has the arm 516 at an initial position 512, illustrated in broken line. During the example manipulation operation, the user 100 moves the arm 516 from the initial position 2 to an updated position 514C. Updated positions 514 are illustrated in solid line, and the manipulation operation and subsequent modifications are illustrated as an unnumbered arrow pointing from the initial position 512 to the updated position 514 in each pose 504.

For example, in the animation shown in FIG. 4, the arm 516 of the character 502 is swinging, and the user 100 wishes to modify the swinging. The user 100 approaches the platform 510 within the virtual environment 500 near one of the pose objects 504 (e.g., pose object 504C) and uses the virtual hand 520 to virtually move the arm 516 from the initial position 512C of the pose object 504C to the updated position 514C. The user 100 may perform this operation via a VR control device that detects (e.g., tracks) hand movements of the user 100's real hand (e.g., the VR input devices 206). For example, the user 100 may grasp (e.g., grab and hold) the arm 516 at the initial position 512C and rotate the arm 516 to the desired position, releasing the arm 516 when it is at the updated position 514C. In some embodiments, grabbing and moving the arm 516 includes grabbing and manipulating colliders. The movement may be restricted by limitations imposed by the 3D object (e.g., the 3D animation rig 302 for the character 502).

In the example embodiment, the original movement operations performed on the pose objects 504 are constrained according to animation restraints. Animation restraints may be imposed on the 3D object (e.g., the character 502 and associated pose objects 504) by the animation module 210, by the VR engine 212, or by animation restraints within the 3D object rigging or animation (e.g., rigging relationships that link one or more of the poses 504). The animation restraints may, for example, ensure that the hierarchy and rules of motion for joints of the character 502 are respected across frames as the user 100 moves the arm 516. For example, as the user 100 moves the arm 516 from the initial position 512D to the updated position 514D at the animation time 506D, t=7.2 s, the animation module 210 uses the animation restraints to determine how the arm 516 is postured at the updated position 514D. The animation restraints may modify any aspect of the arm 516 including, for example, position, rotation, flexion, and extension of any joint therein (e.g., according to the 3D animation rig 302 associated with the character 502). The animation restraints may also govern movement of other parts of the object (e.g., shoulder, head) in response to the original movement operation (e.g., to maintain anatomical integrity). In some embodiments, the user 100 may modify those animation restraints. In some embodiments, the animation module 210 various rig points associated with the animation rig 304 as glowing points (e.g., on the pose object 504C).

In the example embodiment, after the user 100 moves the arm 516 associated with the pose object 504C at the animation time 506C, t=6.8 s, the animation module 210 may perform transition modifications, updating one or more nearby poses based on the original movement operation. After a movement operation, the animation module 210 may "smooth" positions of the arm 516 in the frames before or after the animation time 506C. For example, presume that, just prior to the example movement operation illustrated on the pose object 504C, the arm 516 at the animation time 506B, t=6.4 s, is at initial position 512B, and the arm 516 at the animation time 506C, t=6.8 s, is at the initial position 512C. It should be noted that there may be many poses (e.g., for many frames) between animation times t=6.4 s and 6.8 s (not shown), each of which may be modified by a similar transition modification.

When the user 100 performs this example movement operation on the pose object 504C, if left unadjusted, the arm 516 of the character 502 may appear to "jerk" up into the updated position 514C from the frame just preceding the animation time 506C (e.g., where the arm 516 is still in approximately the initial position 512C). This sudden movement may cause the animation of the character 502 to appear unnatural.

To combat this effect, in the example embodiment, the animation module 210 performs transition modifications on nearby frames. Transition modifications are modifications of neighboring frames to smooth transitions of the arm 516 based on the original movement operation. The animation module 210 determines which part or parts of the pose object 504C were moved by the original modification operation (e.g., manipulations done on the rig colliders) (just the arm 516, in this example), and these parts may be changed with transition modifications.

In some embodiments, the animation module 210 may propagate transition modifications into the future or past, from the animation time at which the original movement operation was performed. The animation module 210 may use a damping function that limits the propagation of changes to the neighboring frames. The damping could be a function of the amount of movement imparted by the user 100; for example, a large modification by the user 100 could propagate farther (e.g., to more adjacent frames) than a small modification. Further, the number of frames into the future or past updated with transition modifications may be determined based on the animation restraints.

For example, in response to the original movement operation at the animation time 506C, t=6.8 s, the animation module 210 may propagate transition modifications into the past by moving the arm 516 at the animation times 506A, 506B, and may propagate transition modifications into the future by moving the arm 516 at the animation time 506D. More specifically, the animation module 210 may move the arm 516 at the animation time 506B, t=6.4 s, from an initial position 512B to an updated position 514B, where the initial and updated positions 512A, 514A may be dependent on the animation restraints, as well as on the original movement operation. Two frames away, the animation module 210 may move the arm 516 at the animation time 506A, t=6.0 s, from an initial position 512A to an updated position 514A, where the initial and updated positions are dependent on the animation restraints, as well as on the original movement operation or the preceding transition modifications. The damping function can cause the animation module 210 to create a smaller movement for the arm 516 at the animation time 506A, t=6.0 s than for the arm 516 at the animation time 506B, t=6.4 s based on temporal difference with the object of the original movement operation. Similarly, the animation module 210 may move the arm 516 at the animation time 506D, t=7.2 s, from an initial position 512D to an updated position 514D. While only one forward frame (at t=7.2 s) and two backward frames (at t=6.0 s and t=6.4 s) are shown to be modified in FIG. 5, it should be understood that there may be additional frames between each pair of animation times 506, and that the animation module 210 may similarly propagate transition modifications to those unseen frames.

The transition modifications may be performed automatically (e.g., after a movement operation), or may be performed in response to a request from the user 100. In some embodiments, the transition modifications may be influenced by the animation restraints. For example, in some embodiments, as the arm 516 at the animation time 506C, t=6.8 s, is moved, the arm 516 for the pose objects 504A, 504B, and 504D at animation times t=6.0 s, t=6.4 s, and t=7.2 s, respectively, may all be updated simultaneously, and according to the animation restraints.

In some embodiments, the animation module 210 may create multiple virtual objects at each animation time 506 on the platform 510 (e.g., the pose objects 504 for the character 502, plus perhaps other pose objects for another character in the animation). In some embodiments, the background for each frame may also be displayed. In some embodiments, only one background is displayed in the virtual environment 500 at any given moment. That background may be chosen by the user 100, or may be automatically determined by the animation module 210 (e.g., using the background associated with the pose object 504C based on the most recent focus of the user 100 being on the pose object 504C).

Figure 6:
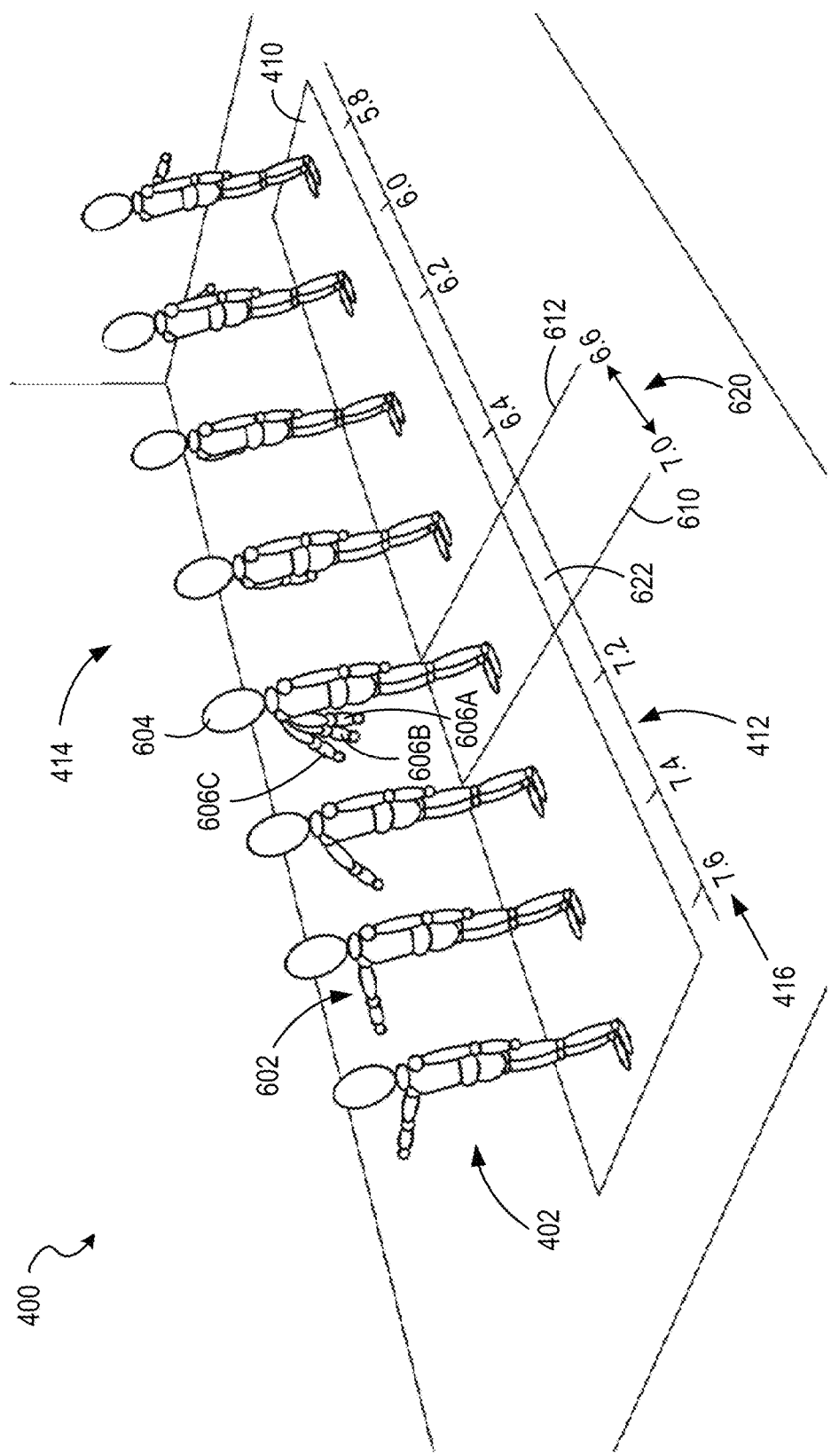
FIG. 6 illustrates an example operations performed on the time bar in the virtual environment.

FIG. 6 illustrates an example operation performed on the time bar 412 in the virtual environment 400. In the example embodiment, the time bar 412 may be modified by the user 100 to compress or expand a region of time (e.g., including multiple animation times 416). The user 100 may initiate a compression operation in the virtual environment 400 by pinching a set of frames (e.g., with their fingers or hands, or via another VR control device). For example, if the user 100 wants to compress a region of time, then the user 100 performs a compression gesture such as, for example, grabbing the two frames at the edges of the region (e.g., a first timebar marker 610 at animation time t=7.0 s and a second timebar marker 612 at animation time t=6.6 s) and squeeze the timebar markers together. In some embodiments, to generate the timebar markers 610, 612, the user 100 may grab the pose object 414 associated with the animation time t=7.0 s with one hand and the pose object 414 associated with the animation time t=6.6 s with the other hand. In other embodiments, the user 100 may touch a point on the time bar 412 with one finger (e.g., at time t=7.0 s) and touch another point on the time bar 412 with another finger (e.g., at time t=6.6 s). The two timebar markers 610, 612 define a compressed region 620 between time t=6.6 s and t=7.0 s. This example compression gesture is one way in which the user 100 may initiate a compression operation. It should be understood that other gestures which identify a region of time, or two animation times within the animation, may be used to initiate a compression operation.

In the example shown in FIG. 6, the compressed region 620 is shown already compressed. A compressed pose object 604 for the compressed region 620 is different from the other displayed pose objects 414, thus providing a visual indication that the compressed region 620 is different than the other frames shown on the time bar. In the example embodiment, the compressed pose object 604 is displayed using a ghosting view, where several pose objects 414 representing the compressed frames are turned partially transparent and superimposed on one another. As illustrated here, a right arm 602 of the character 402 is swinging during the animation, while the rest of the character 402 remains stationary. The arm movement of the character 402 from multiple frames is superimposed to form the compressed pose object 604. More specifically, there are three superimposed arm positions 606A, 606B, and 606C displayed on the compressed pose object 604, one for each animation time 416 within the compressed region 620. The arm position 606A represents the position of the arm 602 at time t=6.6 s, the arm position 606B represents the position of the arm 602 at time t=6.8 s, and the arm position 606C represents the position of the arm 602 at time t=7.0 s. In some embodiments, the compressed pose object 604 in the compressed region 620 may be displayed in a different color from the remainder of the displayed pose object 414.

In the example embodiment, the compressed region 620 provides a break in the time bar 412, thereby allowing the time increment to be different within the compressed region 620. Further, the time bar 412 also provides a visual indicator that the compressed pose object 604 represents a range of time rather than just one point in time (e.g., illustrated by a rectangle 622 highlighting the start time (t=6.6 s) and end time (t=7.0 s) of the compressed region 620).

In some embodiments, the time bar 412 may be divided into different increment ranges. For example, the time increment before the compressed region 620 may be 0.4 seconds, and the time increment after the compressed region 620 may be 3 seconds. In some embodiments, these regional time increments may be adjusted by the user 100, or by the animation module 210.

In the example embodiment, the user 100 may initiate an expansion operation. In some embodiments, the expansion operation may be performed on an already-compressed region such as the compressed region 620. For example, the user 100 may approach the compressed region 620 and make a separation gesture with their two hands (e.g., the hands starting together and pulling apart, as a person would open dual sliding doors). The separation gesture may be performed on the compressed pose object 604, or on the time bar 412 (e.g., on the rectangle 622, or using the timebar markers 610, 612). In response to the separation gesture, the animation module 210 may expand the compressed pose object 604 out into any or all of the pose objects from which it was built (e.g., the pose objects at times t=6.6 s, 6.8 s, and 7.0 s).

In some embodiments, the expansion operation may be performed on an uncompressed pose object, such as the pose objects 504C. For example, the user 100 may perform the separation gesture on the pose object 504C, or on the time bar 508 at the animation time 506C, t=6.8 s. In response to the separation gesture, the animation module 210 may construct pose objects neighboring the pose object 504C (e.g., similar to the original object creation process used for creating the interactive timeline platform 510). In other words, the animation module 210 may begin building pose objects 504 just before and just after the animation time 506C. For example, the animation module 210 may create pose objects at times t=6.7 s and t=6.9 s. In some embodiments, the animation module 210 creates one or more new pose objects 504 at pre-determined distances between the selected animation time (e.g., animation time 506C) and the animation time preceding or succeeding the selected animation time (e.g., animation times 506B or 506D, respectively). In some embodiments, the farther the user 100 extends their hands during the separation gesture, the more granular the expansion gets, and the more expansion pose objects the animation module 210 creates.

Figure 7A:
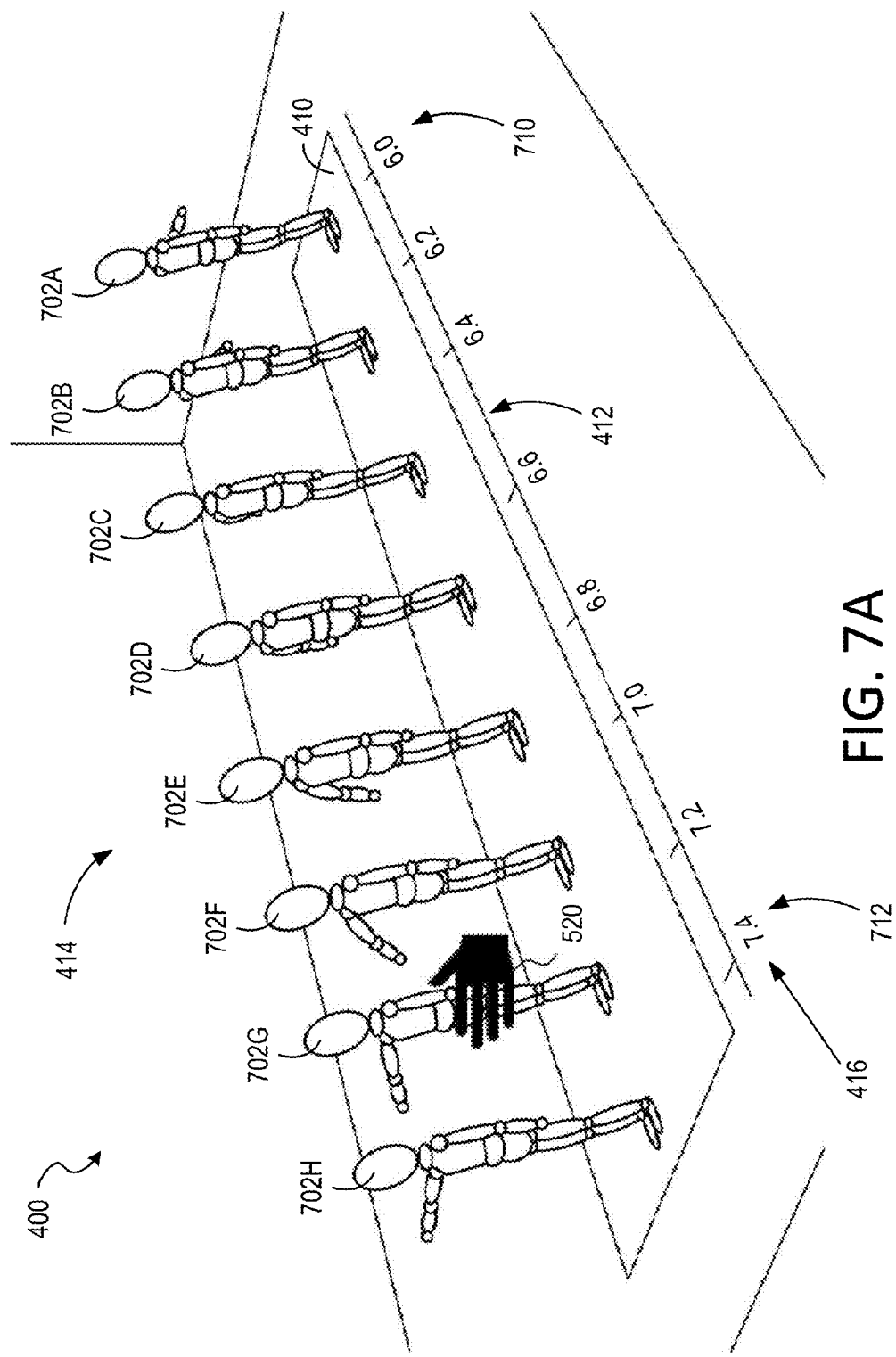
FIGS. 7A and 7B illustrate timeline scrolling operations that allow the user to scroll through the animation within the interactive timeline.
Figure 7B:
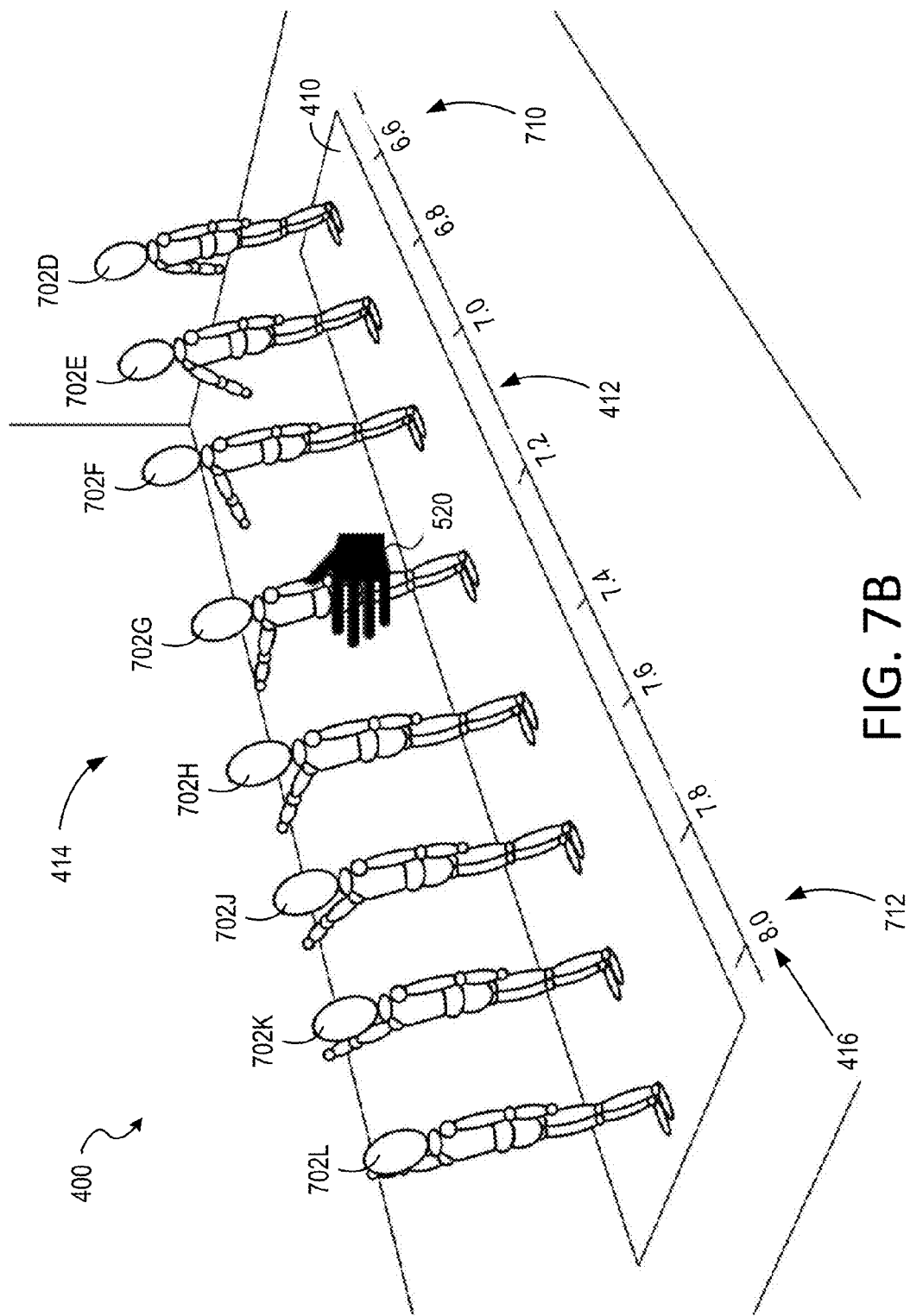

FIGS. 7A and 7B illustrate timeline scrolling operations that allow the user 100 to scroll through the animation within the interactive timeline platform 410. In some embodiments, the interactive timeline platform 410 may show an entire animation (e.g., from beginning to end). In the example embodiments shown in FIGS. 7A and 7B, the interactive timeline platform 410 shows only a portion of an animation. The portion of the sequence shown on the platform 410 starts at an animation start time 710 and ends at an animation end time 712, thereby defining a timeline range.

In the example embodiment shown in FIG. 7A, the timeline range is between t=6.0 s and t=7.4 s, with a consistent 0.2 s animation increment. Further, in this example, the user 100 performs a timeline scrolling operation that moves the timeline range displayed on the interactive timeline platform 410. To initiate a scroll operation, the user 100 performs a scroll gesture on the interactive timeline platform 410 within the virtual environment 400. In some embodiments, the scroll gesture may include grabbing a pose object (e.g., a pose object 702G) with the virtual hand 520 and moving the virtual hand 520 to the right or left. In some embodiments, the scroll gesture may include swiping the virtual hand 520 to the left or to the right on the time bar 412, or grabbing and throwing the pose object 702 to the left or the right, thereby causing the time bar 412 to 'fly' by the stationary user 100 and land in a new time position (e.g., with a new timeline range).

In this example, the user 100 grabs the pose object 702G with the virtual hand 520 (e.g., as shown in FIG. 7A) and moves the virtual hand 520 to the right. As the user 100 moves the virtual hand 520, the animation module 210 shifts the time bar 412 to the right, along with all of the pose objects 702 and associated animation times 416. As the animation times 416 and their associated pose objects 702 reach the right edge of the interactive timeline platform 410, the animation module 210 removes the associated pose object 702 from the interactive timeline platform 410. Further, the animation module 210 also adds a new pose object 702 onto the opposite end of the interactive timeline platform 410, as this new animation time 416 "comes into view" (e.g., as the next time increment is exposed). For example, the first pose object 702 to get removed during this scroll operation is the pose object 702A, at animation time 416 t=6.0 s. When the animation module 210 removes the pose object 702A from the right end of the interactive timeline platform 410, the animation module 210 also adds the next pose object 702J, and associated animation time 416 at t=7.6, to the opposite end. This process continues until the user 100 ceases the scrolling operation, or until the scrolling operation otherwise stops.

FIG. 7B illustrates the results of this example scrolling operation. In this example, the user 100 stopped the scrolling operation by releasing the pose object 702G where shown. As such, the pose objects 702A-C were removed during the scrolling operation, and pose objects 702J-L were added. Further, the timeline range has changed during the process. At the end of the scrolling operation, the timeline range rests at t=6.6 s to 8.0 s.

As such, the user 100 may scroll through the animation using the scrolling gesture, and may similarly scroll in either direction (e.g., either forward in time by gesturing toward the right, or backward in time by gesturing toward the left).

Figure 8A:
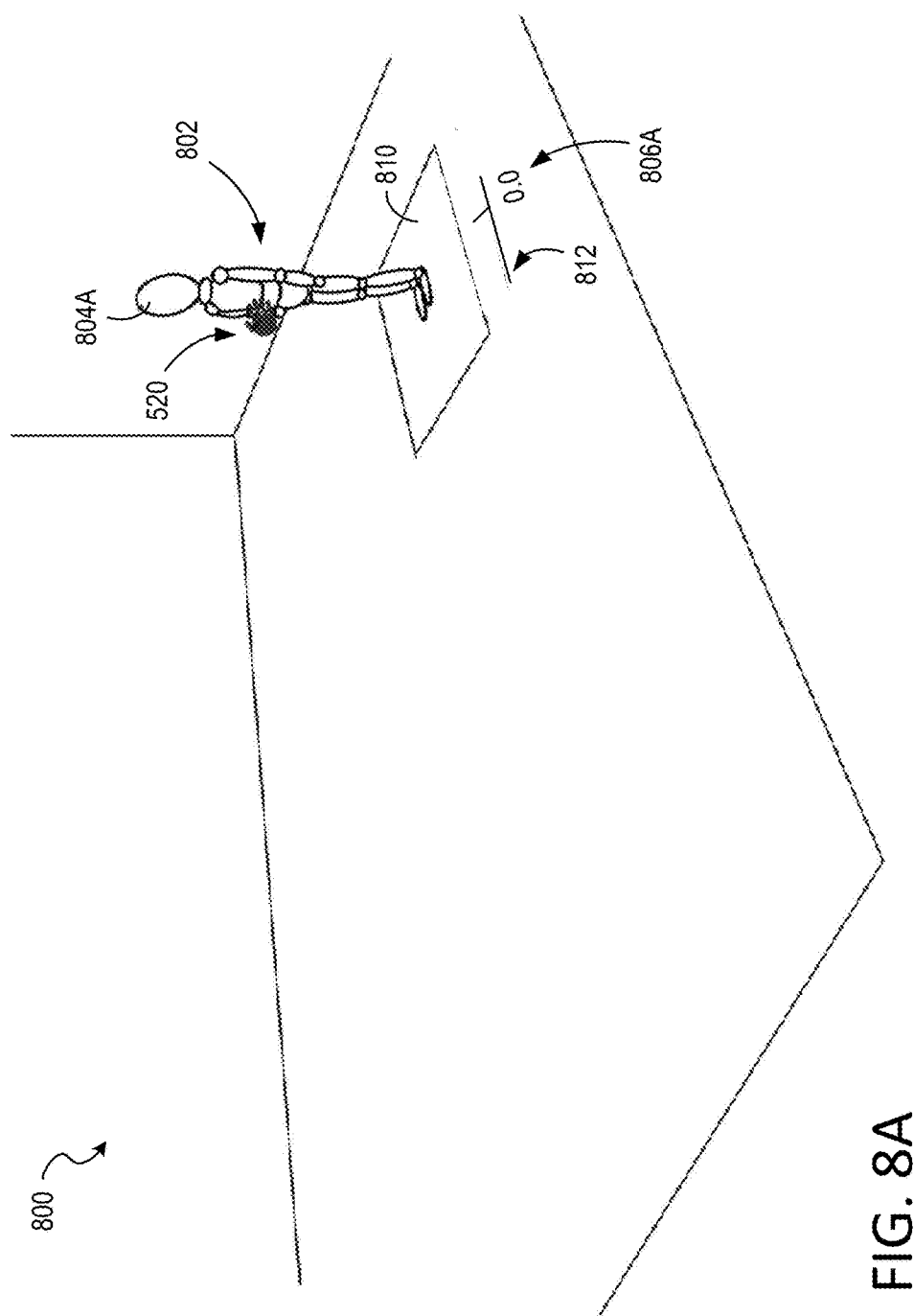
FIGS. 8A-8C illustrate the user creating an animation in a virtual environment using an interactive timeline.
Figure 8B:
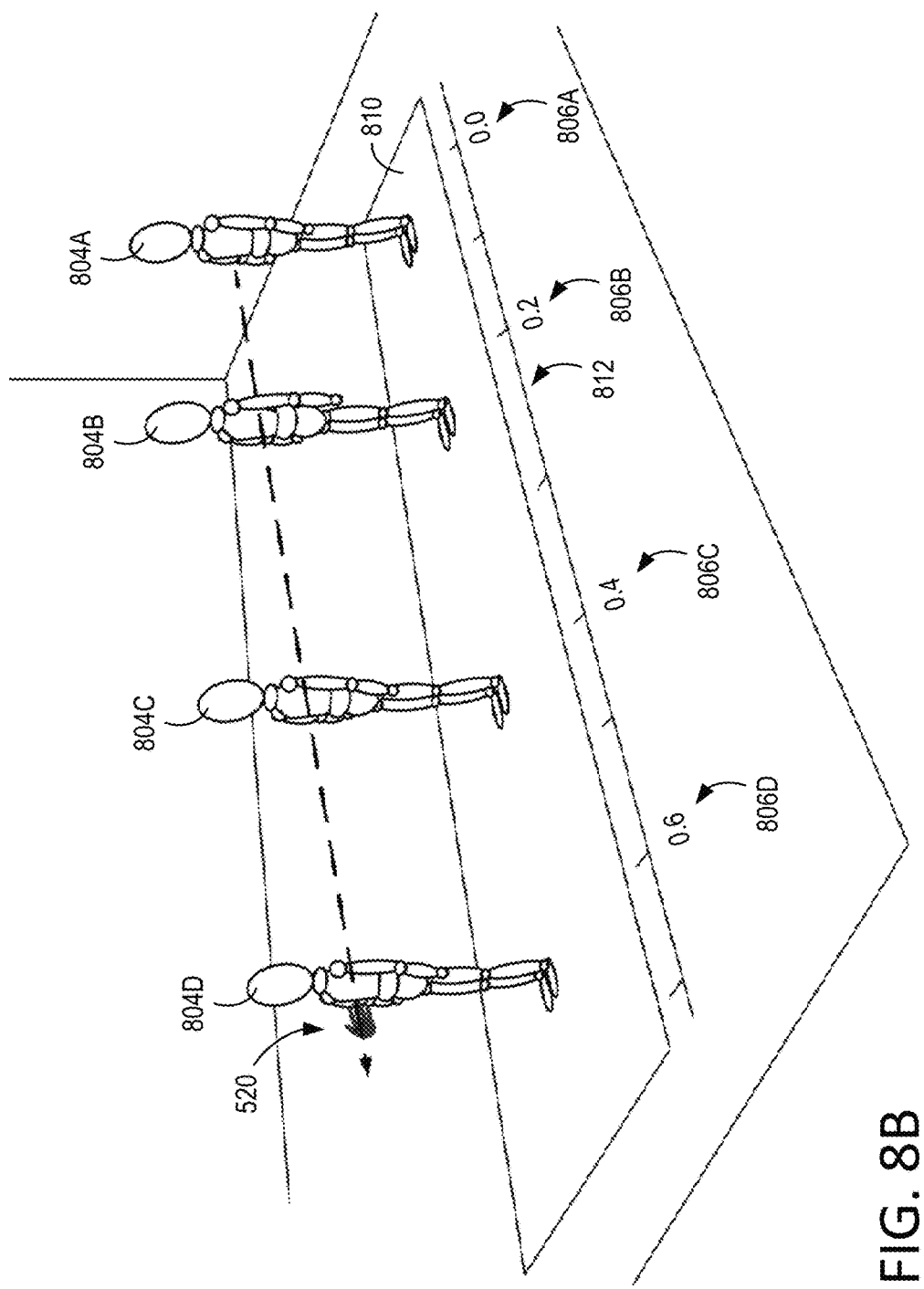
Figure 8C:
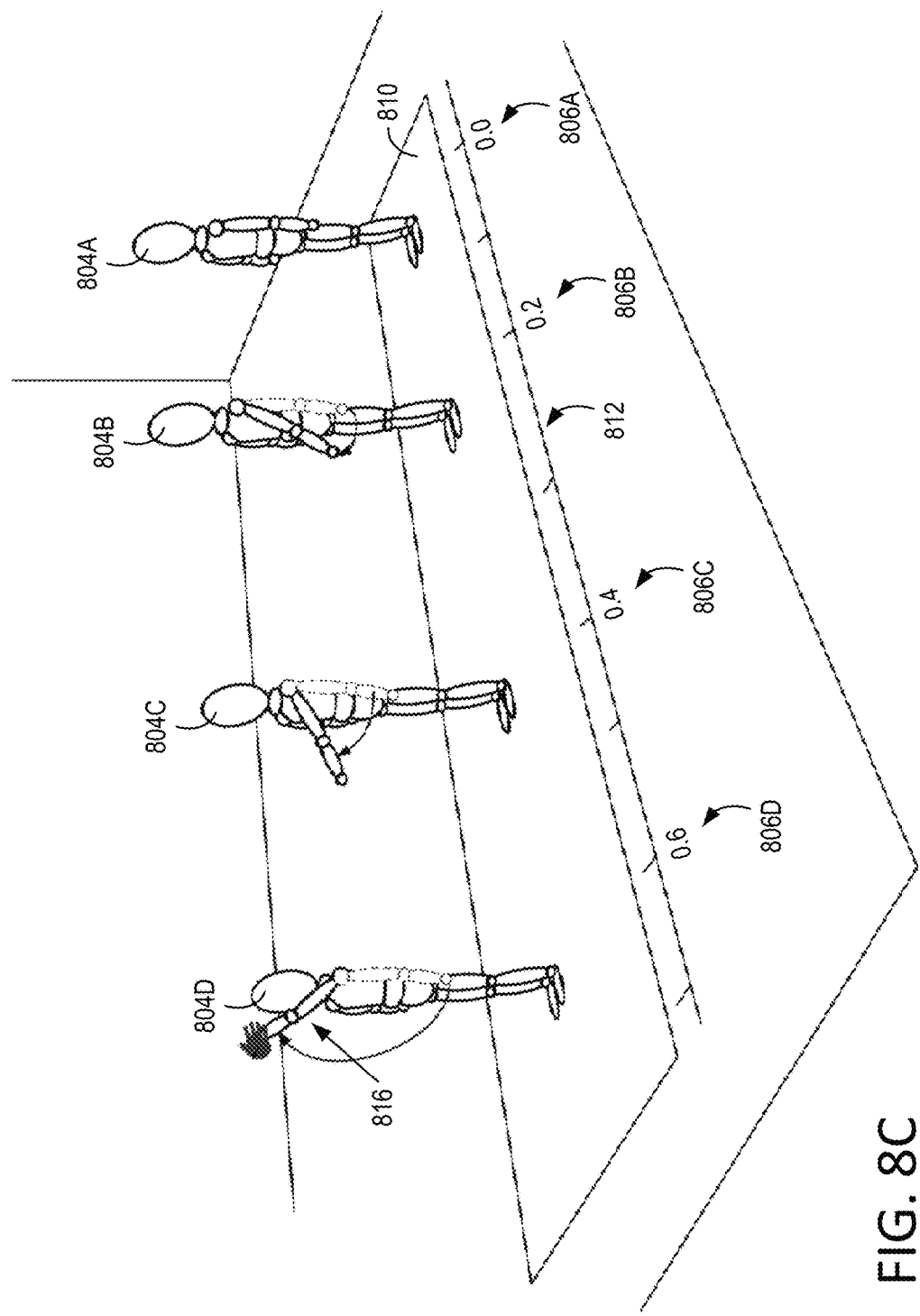

FIGS. 8A-8C illustrate the user 100 creating an animation in a virtual environment 800 using an interactive timeline platform 810. FIG. 8A illustrates an initial step of the animation creation process. In the example embodiment, the interactive timeline platform 810 starts with a single 3D object, such as a pose object 804A of a character 802, or the 3D animation rig 302. The pose object 804A is positioned at an animation time 806A, t=0.0, on a time bar 812. In some embodiments, the character 802 may be similar to the character 402, the interactive timeline platform 810 may be similar to the interactive timeline platform 410, the time bar 812 may be similar to the time bar 412, and the pose objects 804 may be similar to the pose objects 504. The user 100 then adds frames (e.g., before or after, to increase the length of the animation) using an animation extension operation.

FIG. 8B illustrates an example animation extension operation performed by the user 100 using the platform 810. The user 100 uses the virtual hand 520 to initiate the animation extension operation by performing an animation extension gesture. More specifically, and in the example embodiment, the animation extension gesture includes the user 100 grabbing the initial pose object 804A and pulling the initial pose object 804A to the left along the time bar 812 (e.g. in a positive time direction). In response to the animation extension gesture, the animation module 210 adds new pose objects 804B, 804C, and 804D to the left of the initial pose object 804A, thereby increasing the length of the animation. More specifically, the animation module 210 adds new pose objects 804 at each animation interval of the time bar 812, based on the length of the dragging performed by the user 100. In this example, the animation interval is 0.2 units and the user 100 drags the initial pose object 804A to just past the 0.6 unit mark on the time bar 812. As such, the animation module 210 creates the new pose object 804B at an animation time 806B, the new pose object 804C at an animation time 806C, and the new pose object 804D at an animation time 806D. In some embodiments, the animation module 210 creates and displays the new pose objects 804B-D while the user 100 is performing the animation extension gesture (e.g., as the virtual hand 520 passes each successive animation interval). In other embodiments, the animation module 210 creates all of the new pose objects 804B-D once the user 100 has completed the animation extension gesture. In the example embodiment, the animation interval is a pre-determined value, such as 0.2 units. In some embodiments, the user 100 may input or alter the animation interval. Initially, the new pose objects 804B-D are copies of the initial pose object 804A.

FIG. 8C illustrates the user 100 performing a movement operation on an arm 816 of the pose object 804D. In response to the movement operation, the animation module 210 performs transition manipulations on each of the pose objects 804A-C, as described above with respect to FIGS. 8A-C. It should be understood that, while the example in FIG. 8 shows only four pose objects, the animation module 210 may create multiple poses of the character 802 each pair of animation times 806.

Figure 9:
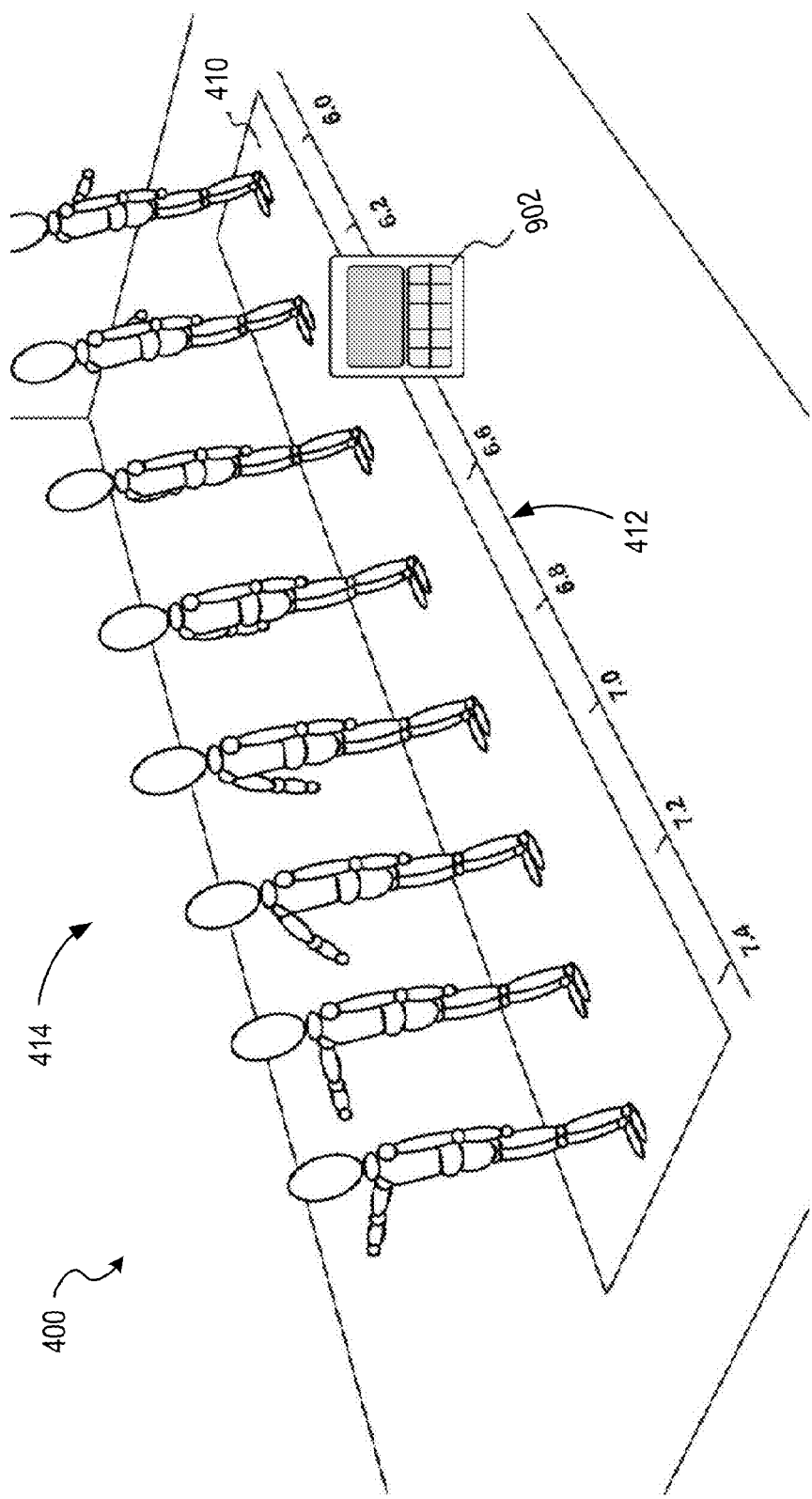
FIG. 9 illustrates a small screen interface provided by the animation module in the virtual environment that may be used to modify the interactive timeline.

FIG. 9 illustrates a small screen interface 902 provided by the animation module 210 in the virtual environment 400 that may be used to modify the interactive timeline platform 410. In the example embodiment, the small screen interface 902 allows the user 100 to modify aspects of the interactive timeline platform 410, including the time bar 412 and the pose objects 414. The small screen interface 902 floats in the virtual environment 400 and stays with the user 100 (e.g., within a certain distance) as the user 100 moves through the virtual environment 400. In some embodiments, the small screen interface 902 may be used to perform any of the operations for the interactive timeline platform 410 described herein. The small screen interface 902 may be used to directly modify the properties of the interactive timeline platform 410 to navigate and display any portion of the animation. For example, the small screen interface 902 can be used to modify the start time, end time, animation interval, or timeline range of the time bar 412, compress or expand regions, scroll the time bar 412, and so forth. As changes are made via the small screen interface 902, the animation module 210 updates the full scale interactive timeline platform 410 in the virtual environment 400 based on the changes made. The small screen interface 902 may be used to play and stop the animation, to move the user 100 to another point in time within the animation, or to collapse or expand any series of frames. The small screen interface 902 may also display additional information (e.g., in text format) regarding the animation. The small screen interface 902 may be closed by the user 100 if no longer needed.

Figure 10:
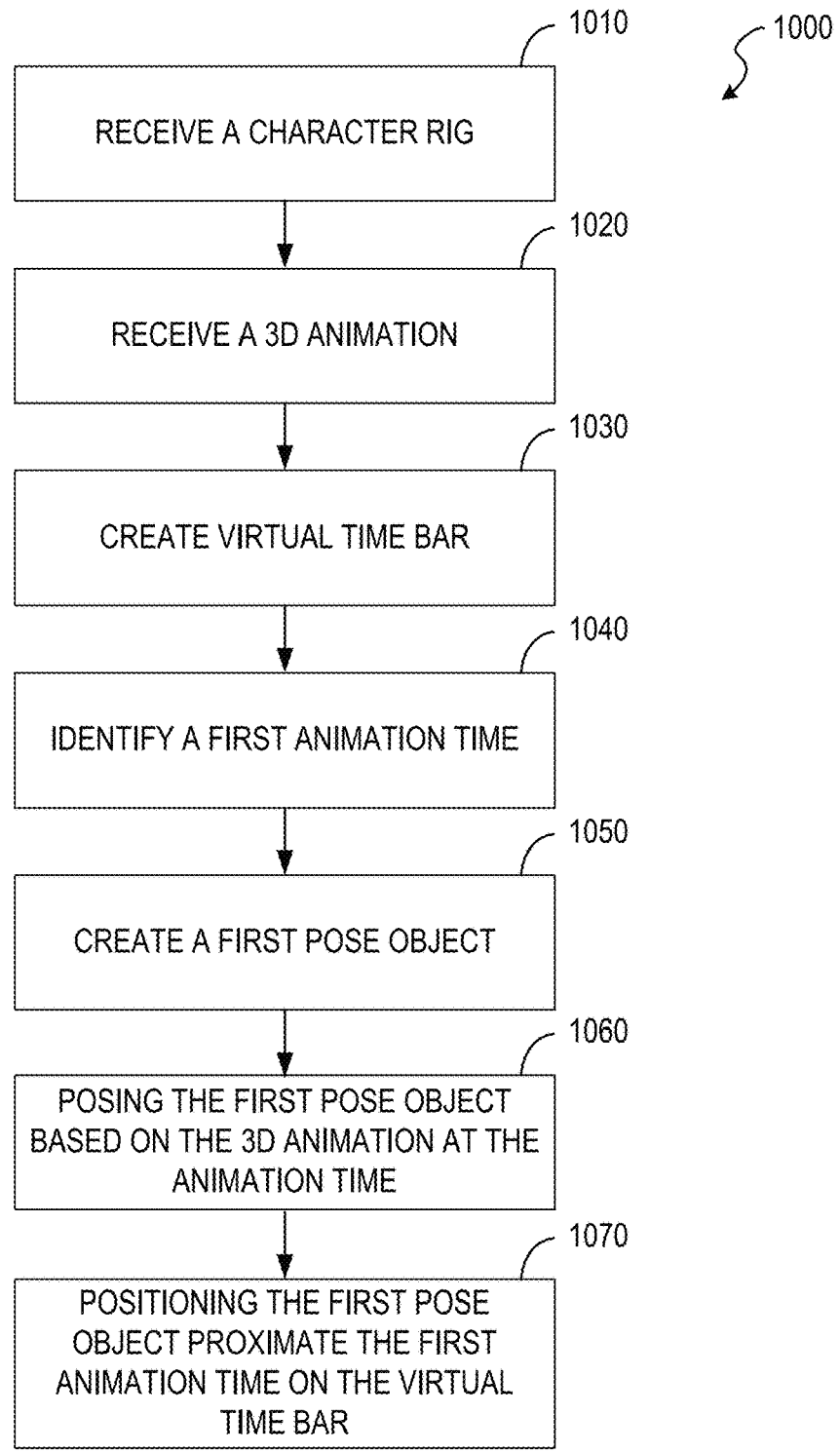
FIG. 10 illustrates an example computer-implemented method for providing the interactive timeline platform.

FIG. 10 illustrates an example computer-implemented method 1000 for providing the interactive timeline platform 410. The computer-implemented method 1000, hereafter referred to as "the method 1000," is performed by a computing device comprising at least one hardware processor and a memory. In the example embodiment, the method 1000 includes receiving a character rig of a three-dimensional (3D) character (see operation 1010). The method also includes receiving a first 3D animation of the 3D character, the first 3D animation defines a motion sequence of the 3D character based at least in part on the character rig (see operation 1020).

In the example embodiment, the method 1000 further includes creating a virtual time bar within a virtual environment, the virtual time bar displaying a timeline associated with the first 3D animation, the virtual environment is displayed to a user wearing a head mounted display (HMD) (see operation 1030). The method 1000 also includes identifying a first animation time within the first 3D animation, the first animation time is a point in time during the motion sequence (see operation 1040). The method 1000 also includes creating a first pose object of the 3D character in the virtual environment (see operation 1050). The method 1000 further includes posing the first pose object in the virtual environment based on the first 3D animation at the animation time (see operation 1060). The method 1000 also includes positioning the first pose object within the virtual environment proximate the first animation time on the virtual time bar (see operation 1070).

In some embodiments, the method 1000 also includes receiving indication of a movement operation associated with the first pose object, the movement operation is performed by the user in the virtual environment, the move operation includes the user moving a component of the first pose object, and automatically altering a pose of a second pose object within the virtual environment based at least in part on the movement operation.

In some embodiments, the virtual environment includes a second pose object positioned proximate a second animation time on the virtual time bar, the second pose object is in a pose different than different than the first pose object, AND the method 1000 also includes receiving indication of a compression gesture performed by the user in the virtual environment using an input device, the compression gesture identifies the first animation time and the second animation time, the input device is configured to allow the user to interact with virtual objects presented in the virtual environment, and reducing the first pose object and the second pose object into a single, compressed pose object within the virtual environment, the compressed pose object displays at least a difference between the pose of the first pose object and the pose of the second pose object.

In some embodiments, the method further includes receiving indication of a scrolling gesture performed by the user in the virtual environment using an input device, the scrolling gesture includes (1) one of (a) grabbing the first pose object and (b) pressing a point on the time bar and (2) gesturing to one of the left and the right with the input device, the input device is configured to allow the user to interact with virtual objects presented in the virtual environment, and simultaneously moving the first pose object and the time bar to the one of the left and the right.

In some embodiments, the method 1000 further includes receiving indication of an animation extension gesture performed by the user in the virtual environment using an input device, the animation extension gesture includes grabbing the first pose object and gesturing to one of the left and the right with the input device, the input device is configured to allow the user to interact with virtual objects presented in the virtual environment, and creating a second pose object within the virtual environment in response to the animation extension gesture.

In some embodiments, the method 1000 further includes generating a modified 3D animation based at least in part on the first pose object, the modified 3D animation is different than the first 3D animation. In some embodiments, the method 1000 further includes determining a second animation time based on the first animation time and a predetermined animation increment, creating a second pose object of the 3D character in the virtual environment, and positioning the second pose object within the virtual environment proximate the second animation time on the virtual time bar.

The examples of how to use the interactive timeline platform 410 are shown to illustrate the systems and methods described herein, and associated benefits. Such examples of use should not be construed to be limitations on the logical process embodiments, nor should variations of user interface methods from those described herein be considered outside the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Programming Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-10 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the systems and methods described herein in different contexts from this disclosure.

Figure 11:
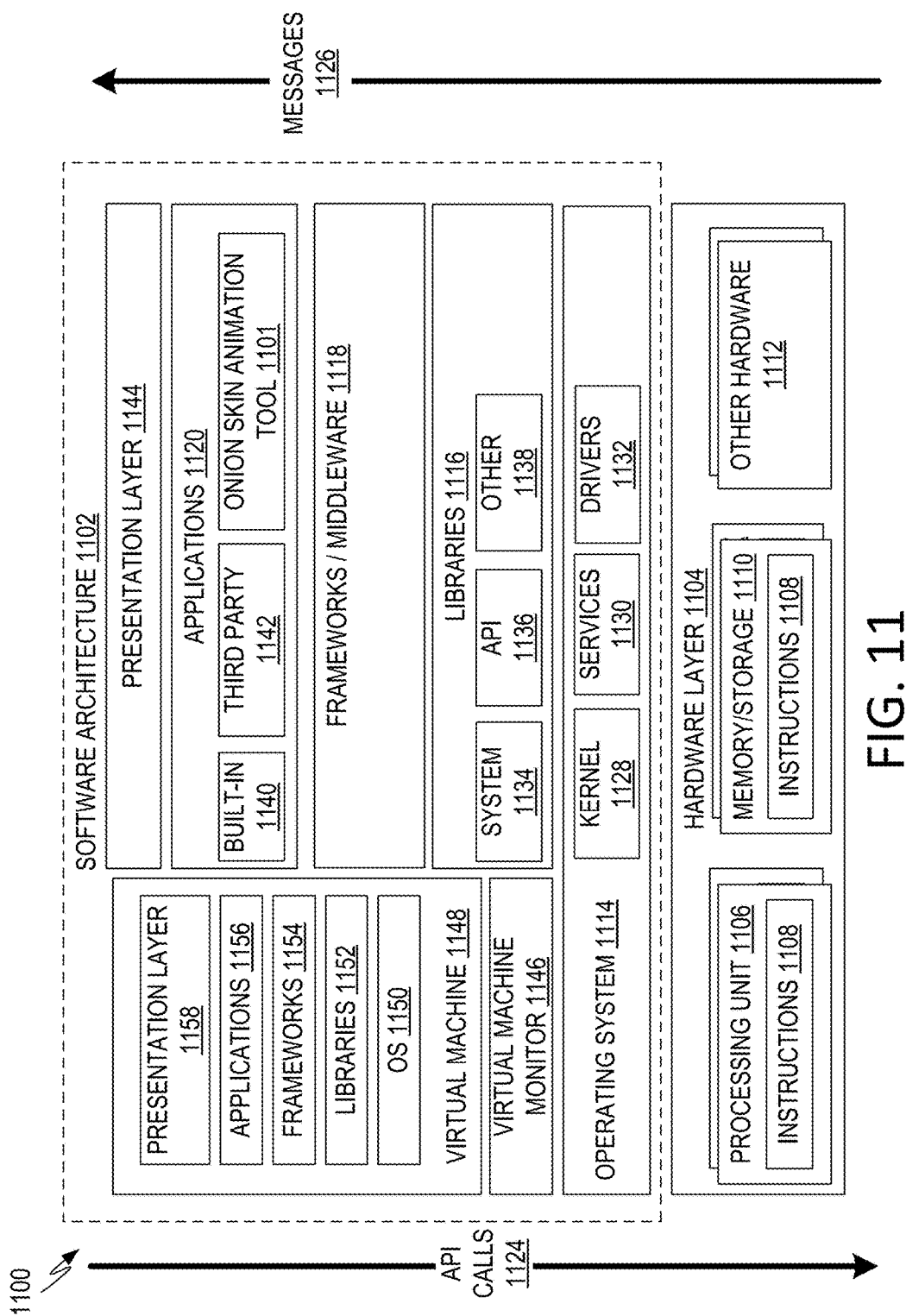
FIG. 11 is a block diagram illustrating a representative software architecture, which may be used in conjunction with various hardware architectures described herein to provide the VR tools and development environment described herein.

FIG. 11 is a block diagram 1100 illustrating a representative software architecture 1102, which may be used in conjunction with various hardware architectures described herein to provide the VR tools and development environment described herein. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules and so forth of FIGS. 1-10. Hardware layer 1104 also includes memory or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 or other software components/modules, some of which may be specific to a particular operating system or platform.

The applications 1120 include built-in applications 1140 or third party applications 1142. Examples of representative built-in applications 1140 may include, but are not limited to, a contacts application, a browser application, a book reader application, a location application, a media application, a messaging application, an onion skin animation tool 1401, or a game application. The third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as the operating system 1114 to facilitate functionality described herein.

The applications 1120 may utilize built in operating system functions (e.g., kernel 1128, services 1130 or drivers 1132), libraries (e.g., system libraries 1134, API libraries 1136, and other libraries 1138), and frameworks/middleware 1118 to create user interfaces to interact with users of the system. Alternatively, or additionally, in some systems interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware machine (such as the machine 1500 of FIG. 12, for example). A virtual machine is hosted by a host operating system (operating system 1114 in FIG. 11) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156, or presentation layer 1158. These layers of software architecture executing within the virtual machine 1148 can be the same as corresponding layers previously described or may be different.

In the example embodiment, the VR engine 1401 operates as an application in the applications 1120 layer. However, in some embodiments, the VR engine 1401 may operate in other software layers, in multiple software layers (e.g., framework/middleware 1118 and applications 1120), or in any architecture that enables the systems and methods as described herein. The VR engine 1401 may be similar to the VR engine 212.

Figure 12:
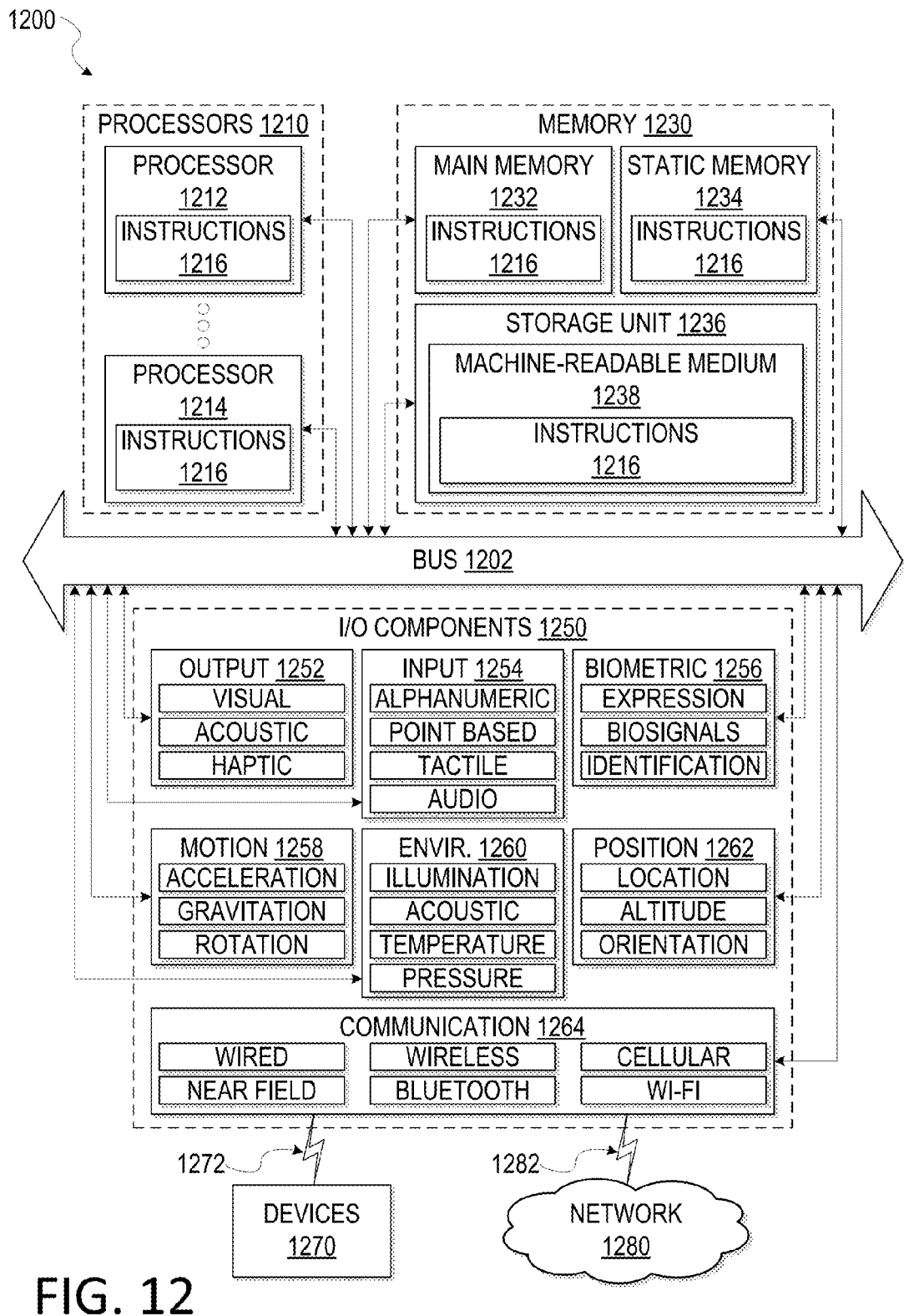
FIG. 12 is a block diagram illustrating components of a machine, according to some example embodiments, able to read instructions from a machine-readable medium (e.g., a machine-readable storage medium) and perform any one or more of the VR methodologies discussed herein.

FIG. 12 is a block diagram illustrating components of a machine 1200, according to some example embodiments, able to read instructions from a machine-readable medium 1138 (e.g., a machine-readable storage medium) and perform any one or more of the VR methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions may cause the machine to execute the flow diagrams of FIG. 10. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include a multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), position-sensing components, and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    one or more hardware processors;
    a head mounted display (HMD) configured to display a virtual environment to a user wearing the HMD;
    an input device configured to allow the user to interact with virtual objects presented in the virtual environment; and an onion skin animation module, executable by the one or more hardware processors, configured to perform operations comprising:
    receiving a character rig of a three-dimensional (3D) character;
    receiving a first 3D animation of the 3D character, the first 3D animation defining a motion sequence of the 3D character based at least in part on the character rig;
    creating a virtual time bar within the virtual environment, the virtual time bar displaying a timeline associated with the first 3D animation;
    identifying a first animation time within the first 3D animation, the first animation time being a point in time during the motion sequence;
    creating a first pose object of the 3D character in the virtual environment;
    posing the first pose object in the virtual environment based on the first 3D animation at the animation time;
    positioning the first pose object within the virtual environment proximate to the first animation time on the virtual time bar;

receiving indication of a movement operation associated with the first pose object, the movement operation performed by the user in the virtual environment, the move operation including the user moving a component of the first pose object; and propagating a transition modification associated with the movement object to a series of neighboring pose objects, the transition modifications calculated to smooth transitions of the component between the first pose object and the neighboring pose objects, wherein a damping function is used to limit the propagating of the transition modification between the first pose object and the neighboring pose objects.

2. The system of claim 1, wherein the virtual environment includes a second pose object positioned proximate to a second animation time on the virtual time bar, the second pose object being in a pose different than different than the first pose object, wherein the onion skin animation module is further configured to perform operations further comprising:

receiving indication of a compression gesture performed by the user in the virtual environment using the input device, the compression gesture identifying the first animation time and the second animation time; and reducing the first pose object and the second pose object into a single, compressed pose object within the virtual environment, the compressed pose object displaying at least a difference between the pose of the first pose object and the pose of the second pose object.

3. The system of claim 1, wherein the onion skin animation module is further configured to perform operations comprising:

receiving indication of a scrolling gesture performed by the user in the virtual environment using the input device, the scrolling gesture including (1) one of (a) grabbing the first pose object and (b) pressing a point on the time bar and (2) gesturing to one of the left and the right with the input device;

simultaneously moving the first pose object and the time bar to the one of the left and the right.

4. The system of claim 1, wherein the onion skin animation module is further configured to perform operations comprising:

receiving indication of an animation extension gesture performed by the user in the virtual environment using the input device, the animation extension gesture including grabbing the first pose object and gesturing to one of the left and the right with the input device; and creating a second pose object within the virtual environment in response to the animation extension gesture.

5. The system of claim 1, wherein the onion skin animation module is further configured to perform operations comprising:

generating a modified 3D animation based at least in part on the first pose object, the modified 3D animation is different than the first 3D animation.

6. The system of claim 1, wherein the onion skin animation module is further configured to perform operations comprising:

determining a second animation time based on the first animation time and a pre-determined animation increment;

creating a second pose object of the 3D character in the virtual environment; and positioning the second pose object within the virtual environment proximate the second animation time on the virtual time bar.

7. A computer-implemented method comprising:

receiving a character rig of a three-dimensional (3D) character;

receiving a first 3D animation of the 3D character, the first 3D animation defining a motion sequence of the 3D character based at least in part on the character rig;

creating a virtual time bar within a virtual environment, the virtual time bar displaying a timeline associated with the first 3D animation, the virtual environment being displayed to a user wearing a head mounted display (HMD);

identifying a first animation time within the first 3D animation, the first animation time is a point in time during the motion sequence;

creating a first pose object of the 3D character in the virtual environment;

posing the first pose object in the virtual environment based on the first 3D animation at the animation time;

positioning the first pose object within the virtual environment proximate the first animation time on the virtual time bar;

receiving indication of a movement operation associated with the first pose object, the movement operation performed by the user in the virtual environment, the move operation including the user moving a component of the first pose object; and propagating a transition modification associated with the movement object to a series of neighboring pose objects, the transition modifications calculated to smooth transitions of the component between the first pose object and the neighboring pose objects, wherein a damping function is used to limit the propagating of the transition modification between the first pose object and the neighboring pose objects.

8. The method of claim 7, wherein the virtual environment includes a second pose object positioned proximate to a second animation time on the virtual time bar, the second pose object being in a pose different than different than the first pose object, the method further comprising:

receiving indication of a compression gesture performed by the user in the virtual environment using an input device, the compression gesture identifying the first animation time and the second animation time, the input device is configured to allow the user to interact with virtual objects presented in the virtual environment; and reducing the first pose object and the second pose object into a single, compressed pose object within the virtual environment, the compressed pose object displaying at least a difference between the pose of the first pose object and the pose of the second pose object.

9. The method of claim 7, further comprising:

receiving indication of a scrolling gesture performed by the user in the virtual environment using an input device, the scrolling gesture including (1) one of (a) grabbing the first pose object and (b) pressing a point on the time bar and (2) gesturing to one of the left and the right with the input device, the input device is configured to allow the user to interact with virtual objects presented in the virtual environment; and simultaneously moving the first pose object and the time bar to the one of the left and the right.

10. The method of claim 7, further comprising:
receiving indication of an animation extension gesture performed by the user in the virtual environment using an input device, the animation extension gesture including grabbing the first pose object and gesturing to one of the left and the right with the input device, the input device is configured to allow the user to interact with virtual objects presented in the virtual environment; and
creating a second pose object within the virtual environment in response to the animation extension gesture.

11. The method of claim 7, further comprising:
generating a modified 3D animation based at least in part on the first pose object, the modified 3D animation is different than the first 3D animation.

12. The method of claim 7, further comprising:
determining a second animation time based on the first animation time and a pre-determined animation increment;
creating a second pose object of the 3D character in the virtual environment; and
positioning the second pose object within the virtual environment proximate the second animation time on the virtual time bar.

13. A non-transitory machine-readable medium storing processor-executable instructions which, when executed by a processor, cause the processor to:
receive a character rig of a three-dimensional (3D) character;
receive a first 3D animation of the 3D character, the first 3D animation defines a motion sequence of the 3D character based at least in part on the character rig;
create a virtual time bar within a virtual environment, the virtual time bar displaying a timeline associated with the first 3D animation, the virtual environment is displayed to a user wearing a head mounted display (HMD);
identify a first animation time within the first 3D animation, the first animation time is a point in time during the motion sequence;
create a first pose object of the 3D character in the virtual environment;
pose the first pose object in the virtual environment based on the first 3D animation at the animation time;
position the first pose object within the virtual environment proximate the first animation time on the virtual time bar;
receive indication of a movement operation associated with the first pose object, the movement operation performed by the user in the virtual environment, the move operation including the user moving a component of the first pose object; and
propagate a transition modification associated with the movement object to a series of neighboring pose objects, the transition modifications calculated to smooth transitions of the component between the first pose object and the neighboring pose objects, wherein a damping function is used to limit the propagating of the transition modification between the first pose object and the neighboring pose objects.

14. The machine-readable medium of claim 13, wherein the virtual environment includes a second pose object positioned proximate to a second animation time on the virtual time bar, the second pose object being in a pose different than different than the first pose object, wherein the processor-executable instructions further cause the processor to:
receive indication of a compression gesture performed by the user in the virtual environment using an input device, the compression gesture identifying the first animation time and the second animation time, the input device is configured to allow the user to interact with virtual objects presented in the virtual environment; and
reduce the first pose object and the second pose object into a single, compressed pose object within the virtual environment, the compressed pose object displaying at least a difference between the pose of the first pose object and the pose of the second pose object.

15. The machine-readable medium of claim 13, wherein the processor-executable instructions further cause the processor to:
receive indication of a scrolling gesture performed by the user in the virtual environment using an input device, the scrolling gesture including (1) one of (a) grabbing the first pose object and (b) pressing a point on the time bar and (2) gesturing to one of the left and the right with the input device, the input device is configured to allow the user to interact with virtual objects presented in the virtual environment;
simultaneously move the first pose object and the time bar to the one of the left and the right.

16. The machine-readable medium of claim 13, wherein the processor-executable instructions further cause the processor to:
receive indication of an animation extension gesture performed by the user in the virtual environment using an input device, the animation extension gesture including grabbing the first pose object and gesturing to one of the left and the right with the input device, the input device is configured to allow the user to interact with virtual objects presented in the virtual environment; and
create a second pose object within the virtual environment in response to the animation extension gesture.

17. The machine-readable medium of claim 13, wherein the processor-executable instructions further cause the processor to:
generate a modified 3D animation based at least in part on the first pose object, the modified 3D animation is different than the first 3D animation.

* * * * *

UNITED STATES PATENT AND TRADEMARK OFFICE
CERTIFICATE OF CORRECTION

PATENT NO. : 10,032,305 B2
APPLICATION NO. : 15/610325
DATED : July 24, 2018
INVENTOR(S) : Timoni West Page 1 of 1

It is certified that error appears in the above-identified patent and that said Letters Patent is hereby corrected as shown below:

In the Claims

In Column 23, Line 19, in Claim 2, delete "different than different than" and insert --different than-- therefor In Column 24, Line 43, in Claim 8, delete "different than different than" and insert --different than-- therefor In Column 26, Line 5, in Claim 14, before "machine-readable", insert --non-transitory--

In Column 26, Line 9, in Claim 14, after "than", delete "different than"

In Column 26, Line 23, in Claim 15, before "machine-readable", insert --non-transitory--

In Column 26, Line 36, in Claim 16, before "machine-readable", insert --non-transitory--

In Column 26, Line 49, in Claim 17, before "machine-readable", insert --non-transitory--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*